United States Patent [19]

Redmond et al.

[11] Patent Number: 5,414,819
[45] Date of Patent: May 9, 1995

[54] OPTICAL INTERCONNECTION NETWORK

[75] Inventors: Ian Redmond, Princeton; Eugen Schenfeld, Monmouth Junction, both of N.J.

[73] Assignee: NEC Research Institute, Inc., Princeton, N.J.

[21] Appl. No.: 994,220

[22] Filed: Dec. 18, 1992

[51] Int. Cl.[6] .............................. G06F 13/00
[52] U.S. Cl. .................... 395/325; 395/200; 395/800; 385/17; 385/18; 385/24; 364/DIG. 1
[58] Field of Search ................ 395/325, 200, 800; 307/112, 4; 385/17, 18, 24; 364/DIG. 1

[56] References Cited

U.S. PATENT DOCUMENTS

| | | | |
|---|---|---|---|
| 4,630,883 | 12/1986 | Taylor et al. | 350/96.15 |
| 5,093,890 | 3/1992 | Bregman et al. | 385/146 |
| 5,155,778 | 10/1992 | Magel et al. | 385/18 |
| 5,175,824 | 12/1992 | Soderbery et al. | 395/325 |
| 5,255,332 | 10/1993 | Welch et al. | 385/17 |

OTHER PUBLICATIONS

Sakano, Noguchi & Matsumoto "Performances of Lightwave Interconnection Using Spatial Addressing (LISA) & Its Applications for Multiprocessor Systems" Journal of Lightwave Tech. vol. 9 pp. 1733–1741, 1991.
Golshan & Bedi, "Optical Implementation of Clos Network Using Reversible Nonlinear Interface Devices", IEEE Proceedings of 33rd Midweat Symposium on Circuits and Systems, vol. 2. pp. 915–917, 1991.

Primary Examiner—Alyssa H. Bowler
Assistant Examiner—Valerie Darbe
Attorney, Agent, or Firm—Arthur J. Torsiglieri; Philip J. Feig

[57] ABSTRACT

An interconnection network for interconnection in parallel of a large number (N) of processing elements (PE). The network includes three serial switching stages. The first stage in which the processing elements are grouped in r clusters of k processing elements each comprising many small fast electronic switches, one for each cluster. The second stage comprises a large number (N) of optical channels, one for each of the N processing elements. The third stage comprises k photodetectors for each of the clusters and electronic switches of the type in the first stage. Each cluster controls k light sources, one for each channel and k photodetectors in the cluster. Interconnection between processing elements in a common cluster are made solely by way of an electronic switch. Interconnection between processing elements in different clusters is made via the optical channels and one or two of the electronic switches.

3 Claims, 3 Drawing Sheets

OPTICAL INTERCONNECTION NETWORK

FIELD OF INVENTION

This invention relates to an interconnection network for use in the interconnection of separate subsystems of an electronic information processing system, such as a computer.

BACKGROUND OF THE INVENTION

A current trend in large scale computers is to interconnect for operation a large number of small processors in parallel to achieve a system that has the computing power of approximately the total powers of the interconnected processors.

In such systems, it is advantageous that the network used to effect the interconnections operates with high speed. It is also advantageous that the network be reliable and be scalable so that the number of interconnected processors can be readily increased when the total computing power needs to be increased.

The advantages of optics for use in such interconnection networks has long been recognized and a variety of optical interconnect techniques have been proposed.

Of particular relevance to the instant invention have been schemes that use optics to implement "Clos" networks. Clos structures were early described in a paper entitled "A study of non-blocking switching networks" by C. Clos in the Bell Systems Technical Journal Vol 32 pp 406–424 (1953). In a Clos network, or switch, the switching function is achieved by several, typically three or five, separate interconnected serial networks. Schemes that use a Clos network involving optics are also known.

A first such scheme has been described by S. It. Lin, T. P. Krile, and J. F. Walkup in a paper entitled "Two-Dimensional Optical Clos Interconnection Network and its uses", Applied Optics, Vol. 27, No. 9, pp. 1734–1741, May 1, 1988, that describes a 2-D optical three-stage Clos interconnection network made up of a number of feasible crossbars switches of medium size. The optical implementation uses LCLVs (Liquid Crystal Light Valves) to implement each stage of a 3-stage Clos network. Assuming theft all the switches are of the same size ($n \times n$ where $n = \sqrt{N}$ for an $N \times N$ Clos network), then one stage of the 3-stage Clos network will have the following: an input array of $N \times N$, which is replicated $\sqrt{N} \times \sqrt{N}$ times, an LCLV with $N\sqrt{N} \times N\sqrt{N}$ channels which is used to mask out appropriate inputs (out of the replicated input array). Then a lenslet array of $N \times N$ elements is used to collect the desired intermediate output elements. The outputs of one stage are then connected as inputs to the next stage.

A paper by Golshan and Bedi entitled "Optical Implementation of Clos Network Using Reversible Nonlinear Interface Devices" Proc. of 33rd Midwest Symposium on Circuits and Systems, Vol. 2 pp. 915–917, August 1990, describes another optical Clos network constructed from reversible nonlinear interface (RNI) devices. The proposed building block is a $2 \times 2$ optical switch box capable of performing the 4 basic switching actions (direct, cross, up and down broadcast). The $2 \times 2$ switch uses reversible nonlinear interface 4 RNI devices. The propagation time for an RNI device varies with the type of materials used. In the paper, an example implementing a $4 \times 4$ crossbar switch is given, with a total delay of 16 picoseconds to 80 nanoseconds, depending on the basic RNI implementation. In general, to implement a crossbar of $N \times N$, there is a need for $N^2$ RNI devices and a propagation time (neglecting the control problem) of $\log_2(N)$ times the propagation delay for one RNI device. Using such crossbar switches, it is possible to make an optical Clos network.

Neither of these schemes appears to have found wide acceptance for various reasons. Typically, they do not scale readily to large networks, such as ones involving thousands of elements to be interconnected. Also, they tend to be slow despite the use of optics because the techniques used to switch the optics is slow. Additionally, such schemes generally have involved multiple switching layers which makes for added complexity.

SUMMARY OF THE PRESENT INVENTION

The present invention provides an interconnect network that has a number of advantages over such prior art systems.

The invention will be described with particular regard to its use as an interconnect network for a computer that employs a large number (e.g. thousands) of separate processing elements that are operated in parallel to achieve the computing power of a supercomputer. As used hereinafter, the term "processing element" shall mean not only processors, but may include other subsystems such as memories and files, and input and output peripherals, that customarily need to be interconnected in a computer. It should be evident that the invention can be used in other information processing systems that involve large numbers of subsystems that need to be interconnected to permit communication between the subsystems at high speed.

More particularly, the present invention is a parallel processing interconnection network of a three-stage pseudo CLOS type that is well adapted for large scale systems. The network uses both electronically-implemented switches and optically implemented switches, the former being used in the first and third stages and the latter in the intermediate second stage. In addition, the processing elements to be interconnected are grouped in local clusters of k processors, k being relatively small and typically of the order of ten, and the first stage typically is composed of N/k (where N is the total number of processing elements to be interconnected) separate $k \times k$ switches. These switches are implemented electronically using only one switch for each cluster. These switches can be very fast and are readily available. The second stage comprises N global optical channels that are accessed by light sources and supply N photodetectors in the third stage, arranged in T groups, N/k groups, each of k photodetectors. The second stage switch is composed of r groups of channels, which route optical data from each PE. Those switches are assumed to be relatively slow. The switches may take many forms, but their function is to place data from a PE onto the desired optical channel. The third stage in addition advantageously includes the same electronic switches used in the first stage to permit each of the k photodetectors in a group in the third stage to access the input of each of the k processing elements that form a cluster of the first stage. Circuitry including the necessary memory is associated with each cluster to perform the various queuing and routing junctions required.

The $k \times k$ electronic switches, typically of the kind known generically as crossbar switches, may be viewed as an interconnect cache at each cluster. Such an interconnection cache permits very fast and purely electronic interconnection between processing elements in the same cluster by the control circuitry. Accordingly, by assigning to a common cluster processing elements that need to be interconnected at high speed, rapid interconnection is readily achieved between such processing elements without the need for use of optics. Moreover, by appropriate control circuitry communication between two processing elements in different clusters is possible solely by use of the first and third stage without reconfiguring the relatively slow intermediate stage that provides the global optical network, so long as there is available a global channel of the network that already interconnects the two involved clusters. To this end, the control circuitry also functions to provide a queue where outgoing and incoming information is first stored, preferably in the form of packets later to be packet-switched. By grouping the processing elements appropriately in the clusters, one can increase the likelihood that this condition occurs even when the first mentioned condition cannot. In the remaining situation where communication is to be between two processing elements on different clusters that do not already have a global channel interconnecting the two clusters, the communication path will pass through in turn the local electronic switch serving the cluster of the sending processing element and an optical global channel that is appropriately selected, then arrive at the destination cluster including the target or receiving processing element, and finally, use the electronic switch in the destination cluster to reach the target processing element.

By partitioning the communication patterns in the manner described, minimal reconfiguration of the relatively slow global network that forms the intermediate stage should be possible and most of switching should involve only the fast electronic switches at the clusters.

A variety of arrangements are available for the reconfigurable global optical network that forms the intermediate stage.

In a preferred embodiment, each cluster in the first stage of processing elements to be interconnected is coupled by way of an array of light sources to an optical network that includes N distinct communication paths, each terminating on a different photodetector, and interconnection between two processing elements in different clusters is established along such an optical path. To this end, each cluster has associated with it an array of separate light sources, advantageously an array of N sources, so that in each cluster a specific source can be associated with a unique optical path and with a unique photodetector. This insures that there will always be available a separate path for each of the N processing elements. If this insurance is not needed, for example, on the assumption that a certain fraction, for example one half of the processing elements will always be idle at a given time, it should be feasible to operate with fewer optical paths, so long as there is at least one global channel between pair of clusters available for communication at any time. Similarly, if one were to choose to use light sources providing a number of different wavelengths, so that wavelength division can be employed to use a given path at multiple wavelengths, each wavelength serving to provide a separate channel, it is feasible to use fewer paths.

The invention will be better understood from the following more detailed description taken with the accompanying drawing.

DETAILED DESCRIPTION OF THE INVENTION

Figure 1:
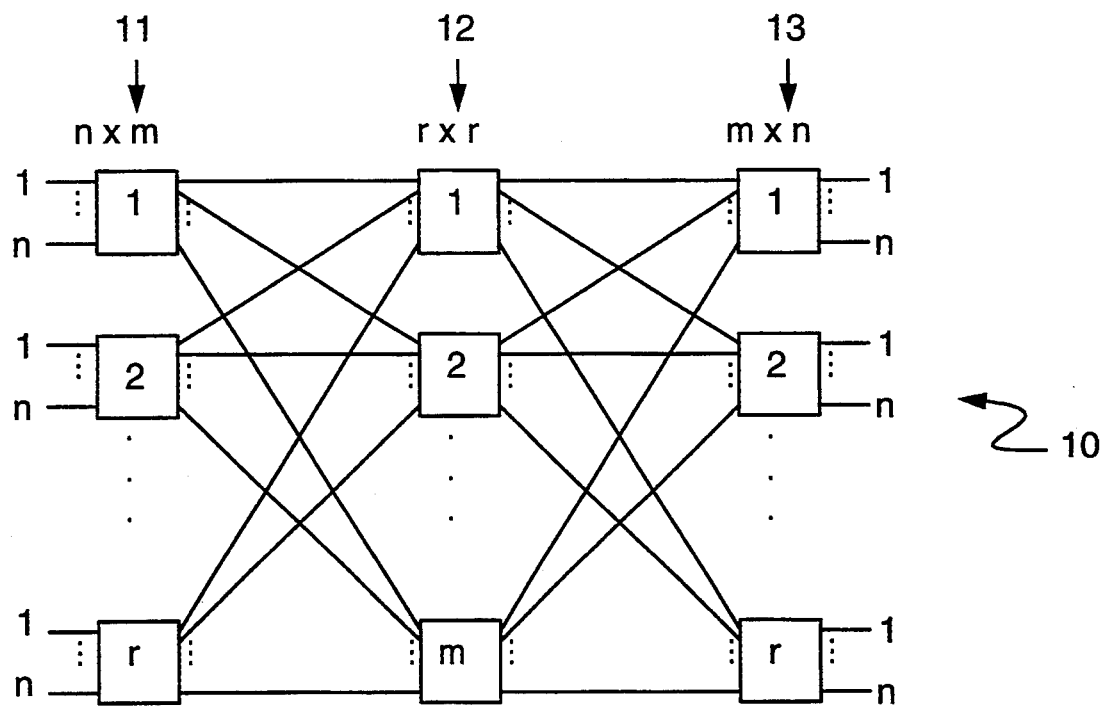
FIG 1 shows the basic arrangement of a 3 stage CLOS type switch.

With reference now to the drawing, FIG. 1 shows a three stage CLOS-type switching network 10 that comprises a first stage 11, an intermediate stage 12, and the third stage 13. The first stage comprises r (n×m) switches, the second stage m(r×r) switches and the third stage r(m×n) switches. This multistage arrangement can be shown to reduce the number of switching elements needed as compared to a single stage switch, when the number of terminals being interconnected is sufficiently large.

In our specific application for use in interconnecting the N processing elements (PEs) of a parallel computer in arbitrary configurations, the processing elements are arranged to form local clusters of k processors where k typically is about ten and n and m are equal to k and k×r=N, and such r clusters form the first stage and each k×k switch typically is an electronic crossbar switch, that can be very fast.

Figure 2:
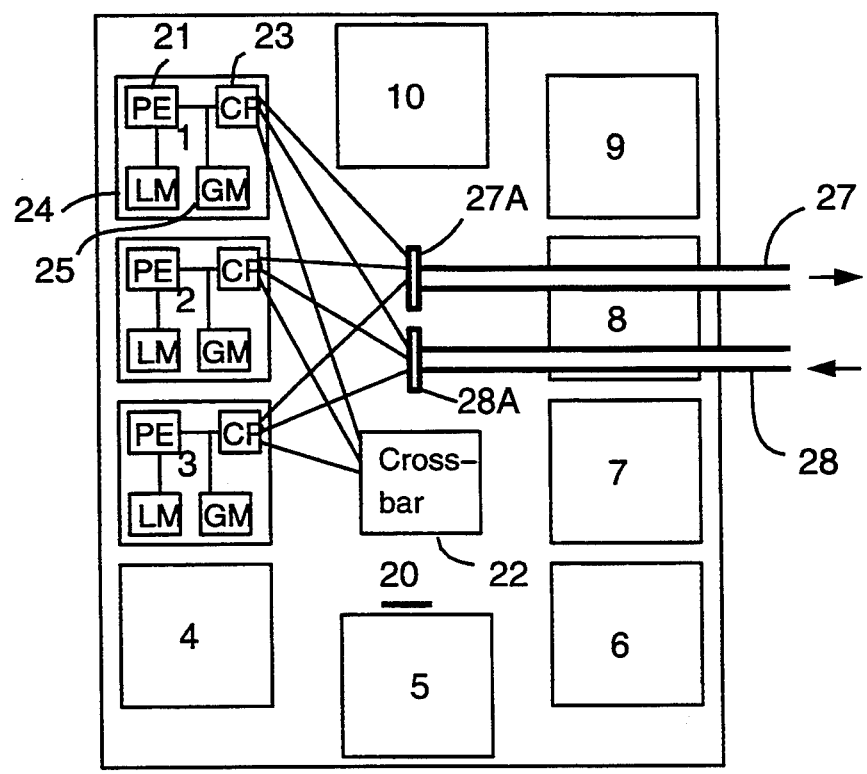
FIG. 2 shows the layout of a circuit board that includes one cluster of processing elements and associated circuitry suitable for use in the invention.

FIG. 2 shows a circuit board 20 that includes a typical cluster of ten PEs 21. Also on the board is a 10×10 crossbar switch 22 that can be used to interconnect any one of the PEs of the cluster to any other PE of the cluster, and the control circuitry associated with each PE that includes the local communications processor 23 that handles the routing and the local memory 24 and global memory 25 that store information for the communications processor 23. The circuit board also includes a cable 27 that is used to transfer signal information from the output terminals of communications processors by way of a terminal block 27A to a laser diode array that advantageously serves as the light sources that input signal information onto the optical global network. Finally the board also includes a cable 28 that is used to transfer signal information from a photodetector group to the communications processors by way of a terminal block 28A for subsequent routing to the desired receiving PE by way of the electronic switch 22.

The second, or intermediate stage, comprises an optical interconnect network that uses free space as the communication medium connecting light sources to photodetectors, with the light source and detectors being distributed to provide N "global" optical channels along which signal information can pass between the first and third stages.

To this end, a separate array of N light sources, one for each of the N global optical channels, is coupled to the k outputs in each cluster of the first stage, so that a given output can be used to modulate signal light introduced into a specific optical channel selected by address information on the signal. Advantageously, each processing element in a cluster controls a different group of N/k light sources by way of its communications processor.

Each optical channel terminates on a different one of N photodetectors. The photodetectors are grouped in N/k clusters of k each photodetectors to match the N/k clusters of the first stage. Each photodetector of a cluster supplies the communications processor of a different processing element of the cluster. The communications processor, upon receiving the detected signal information, routes the detected signal information to the appropriate receiving processing element by way of the board's electronic switch, if need be. Each communications processor includes a queue for temporary storage if necessary, so that the signal information can be transmitted between processing elements without blocking. A distinctive feature of the preferred embodiment of the invention is that the same electronic switch that is used in the first stage for routing signal information from the sending PE to an optical global channel is now available in the third stage to route signal information from the receiving photodetector to the receiving PE. It can be appreciated that while a separate set of communications processors and local and global memories is shown for each processing element, it should be feasible to integrate the ten individual sets into a single common set.

Figure 3:
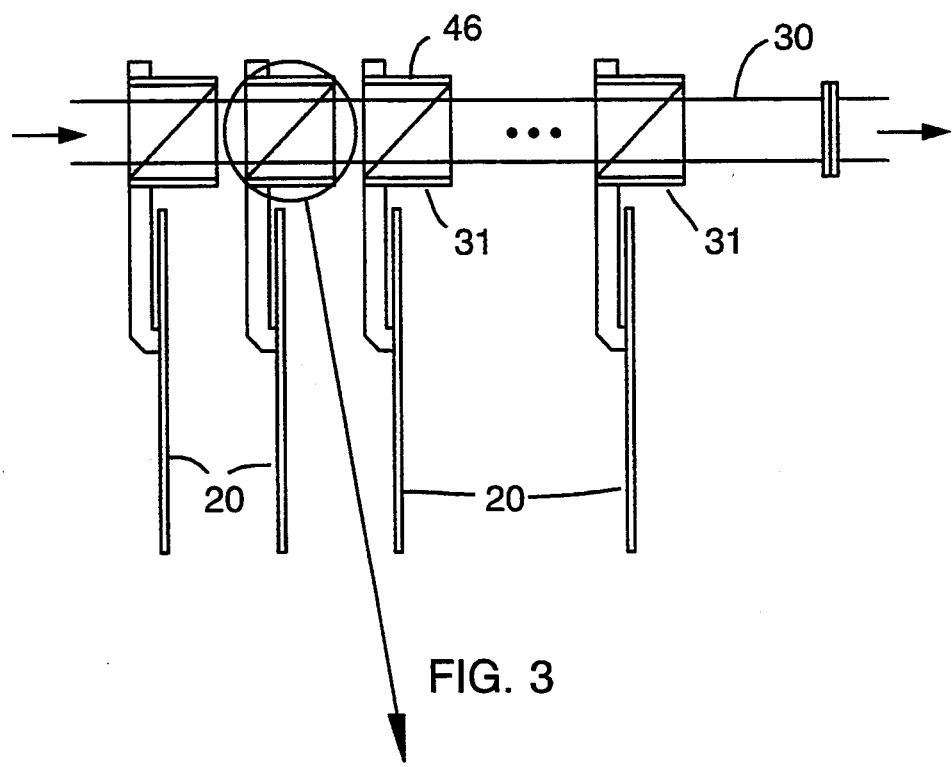
FIG. 3 shows a circuit board coupled to the housing of the optical global channels used to interconnect the clusters in accordance with the invention.

As shown in FIG. 3, each of the circuit boards 20 is coupled to a hollow enclosure 30 within which pass longitudinally the global optical channels of the network. The hollow enclosure, which typically may be square or rectangular in cross section, includes or supports along one wall a succession of arrays of light sources. Each array comprises N light sources, a separate one for each global optical channel, divided in k groups each with N/k light sources 31 A different group is associated with each of the k PEs that form a cluster on the circuit board by means of a cable 27 that extends from the circuit board 20 and plugs into a terminal (not shown) on the enclosure associated with the array of light sources. By means of the control circuitry on the circuit board and the crossbar switch, a PE on a board can be coupled to any desired light source of the array associated with that board.

A sending PE would, in usual fashion, first include in a packet stream of signal information the address of the PE that is the intended receiver. The associated communication processor 22 supplied with the packet stream would first decide whether the signal information is to be sent to a receiving PE on its same board, in which case the information is routed directly by way of the local crossbar switch 22 to the communications processor associated with such PE without use of the optical stage. However if the PE is to communicate with a PE not part of the same cluster and so on a different circuit board, the information is routed from the PEs communications processor via the crossbar switch 22 to the communications processor associated with file appropriate group of light sources in the associated array 31 of light sources for transmission via an optical channel to its intended destination.

It is a function of the communications processor 23 associated with the sending PE that it identify the appropriate one of the k groups of light sources for routing of the signal information, so that a light source appropriate to the intended designation be modulated by the signal information. Generally, it is enough to send the information initially simply to the circuit board associated with the receiving PE since the signal information can then be routed locally on the circuit board via the electronic switch and communication processors to the appropriate PE. In particular, for increased speed, it is advantageous for the communication processor at the sending board in choosing the light source to activate to check the possibility that there already is set up but, not in active use, a global channel between a PE in the sending board and a PE in the receiving board that can be used, the local crossbar switches and communication processors being used for any necessary local switching at the sending and receiving boards.

It is important that the various light beams originating in sources along one wall of the enclosures be redirected for longitudinal travel in the enclosure in separate well defined optical paths. To this end, there is associated with each board an array of N reflecting mirrors, positioned appropriately in the enclosure to reflect the beams from tile light sources to paths parallel to the longitudinal axis of the enclosure to serve as the optical channels.

Figure 4:
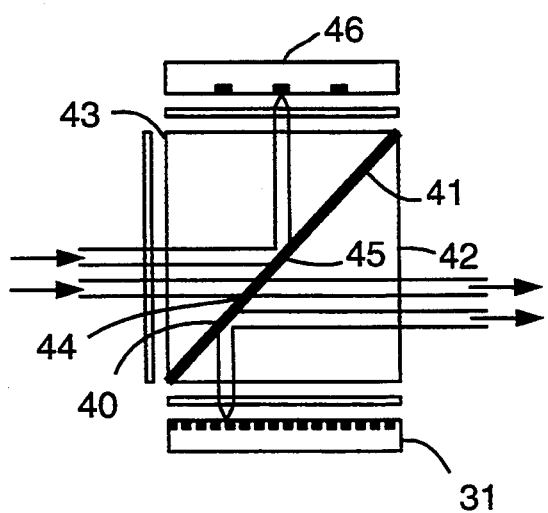
FIG. 4 shows a detail of the optical global network.

As shown in FIG. 4, this is best done by forming for each cluster the reflecting mirrors as an array of N reflecting facets 40, one for each of the N optical channels, along the interface 41 between a pair of right angle isoceles prisms 42, 43 of a solid that is highly transparent to the optical beams. The facets have individually chosen reflectives such that they transmit a substantial fraction of the incident light that passes through them parallel to the longitudinal axis from beams originating upstream, while reflecting to this same longitudinal direction a portion of the light incident thereon that has originated from the light sources along the wall of the enclosure.

Forming the mirrors in a cubic assembly, as shown, that can fit snugly in the enclosure should facilitate ease of assembly and promote the ruggedness of the structure.

For operation in the manner preferred, it will be necessary to make in each cubic assembly k mirrors 45 of the mirror assembly highly reflective of longitudinal incident light beams to deflect such beams towards a sidewall of the enclosure where there is located a corresponding group of k photodetectors 46. Each such mirror serves to couple the optical channel corresponding to its beam to a different one of the k photodetectors and so to the cluster of PEs on the associated circuit board. The electronic switch on the circuit board permits any of the PE's to be supplied by any one of the photodetectors, in the manner previously described for the light sources. A beam incident on a photodetector is converted into an electrical signal that is transmitted to a communications processor associated with the photodetector and thereafter this signal is routed to the intended receiving PE via the local crossbar switch and the communications processor associated with the intended receiving PE. The photodetectors, the local crossbar switch and the communication processors effectively serve as the third stage of the network.

It may sometimes be advantageous (although not shown) to include, at appropriate intervals between the mirror arrays, lenses to refocus the light to minimize spreading that might introduce cross talk between adjacent optical channels.

Additionally, if the transmission losses of the light beams through the series of mirrors become too large, it may be advantageous to introduce repeaters along the path, to amplify or regenerate to a desired amplitude level, incident light beams. A repeater may consist, for example, of an array of photodetectors coupled to an array of sources with some amplification.

Figure 5:
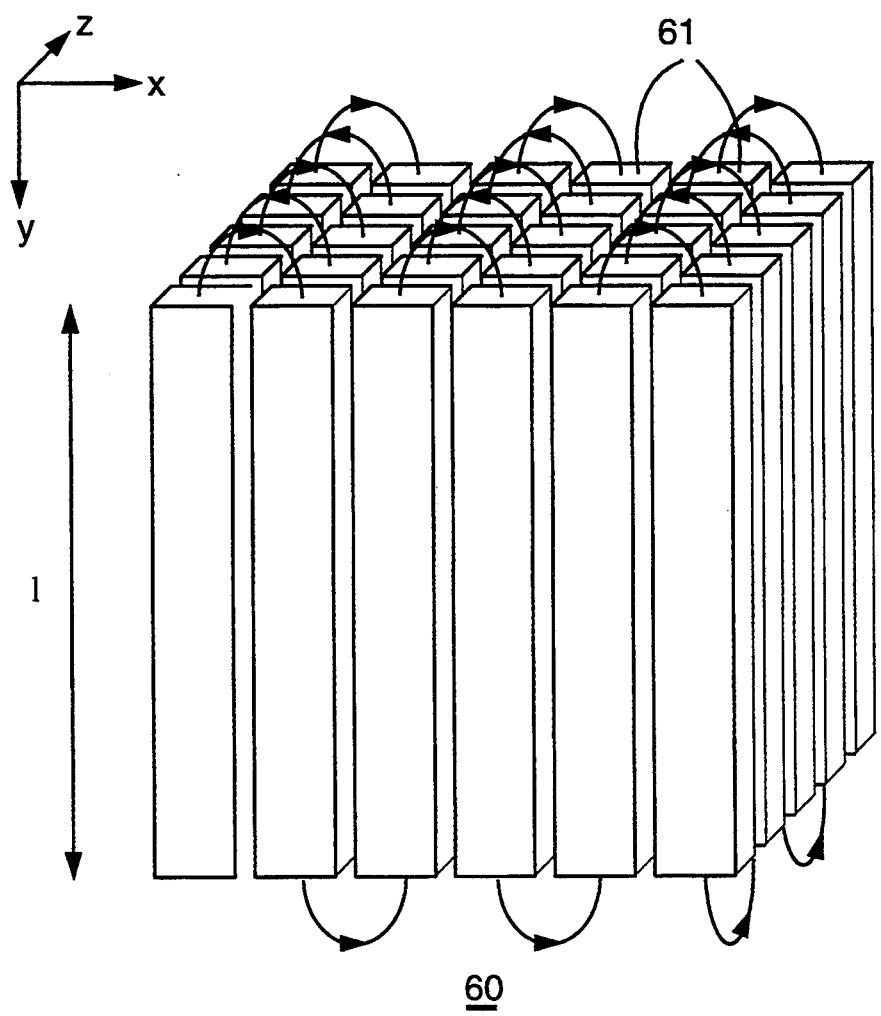
FIG. 5 illustrates how the global optical channel can be folded into segments to shorten the average length of the optical paths.

To provide a more compact structure for the optical network 60, it may be desirable to fold the paths into a series of shorter segments 61 and pack the segments into a cube as illustrated in FIG. 5. In this case, the circuit boards could be located outside the cube and longer cables used to interconnect the boards with the light sources and photodetectors. Folding the paths not only results in more compact structure but also provides a convenient location at each fold to provide the aforementioned repeaters. Additionally, it can be used in some cases to provide a shorter average length of the light paths. For example, if desired, by an appropriate optical routing arrangement a beam, after being regenerated at a fold, can be reintroduced into the optical network selectively in the particular segment that corresponds to or provides a short cut to its intended receiving PE. This should permit in chosen instances the maximum length of travel in the optical network between a sending PE and any receiving PE, exclusive of the travel in changing segments, to be the length of two segments. By increasing the number of segments and shortening the length of each segment, there can be reduced considerably the average length of the paths, simply by addition of suitable optical routing system. Moreover, it is possible by judicious bunching of the optical channels designed for receiving PEs in a common segment and reliance on local switching at the circuit boards to make easy the rerouting of the various light beams into appropriate segments. In some cases, rerouting could be simply done by a suitable mirror system.

It is of course necessary to convert the signal information that is in optical form on the light beams in the optical global network back to the electrical form for routing to the receiving PE. To this end, a total of N photodetectors, one for each optical channel is included in the closure. Advantageously, the photodetectors are arranged in N/k clusters of k photodetectors, one cluster associated with each circuit board. The photodetectors are best positioned along one wall of the hollow enclosure, and the mirror assembly associated with the array of light-emitting diodes of a cluster of PEs is made to include k highly reflecting mirrors along the paths of the k light beams that carry signal information destined for the k PE s included in the associated circuit board. The signal information on these beams that are reflected to the photodetectors is first routed to an assigned communications processor on the board and then via the electronic crossbar on the circuit board to the intended receiving diode, usually by way first of its communications processor.

It should be apparent that various modifications can be made in the specific embodiment described consistent with the spirit and scope of the invention. As previously mentioned light sources of a plurality wavelengths can be used to achieve wavelength division. Moreover, a variety of devices, for example, microprocessors, memories, and various input/output peripherals can constitute "processing elements" for interconnection in the manner described in any information processing system that involves a need for the rapid interconnection of large numbers of such processing elements. Additionally, elements such as holographic optical elements, could in theory be used to form the light originating from the light-emitting diodes into well defined longitudinal beams for axial travel through the enclosure. Additionally, as an alternative to N/k sources, for each PE there N may be available a single source, whose light is routed into a selected channel by means of photorefractive or acousto-optic device, for example.

What is claimed is:

1. An interconnection network for an information processing system comprising:

N processing elements grouped in N/k clusters of k processing elements;

a plurality of local electronic switching means one for each cluster for interconnecting the processing elements in a single cluster;

a plurality of light-emitting means grouped in N/k arrays of N light-emitting means in each array, one array for each cluster;

N light-detecting means, strayed in N/k groups of k light-detecting means, one group for each cluster;

means for forming an optical network comprising N separate optical channels each channel terminating at a respective light-detecting means, and a plurality of communication processing means, one for each processing element, for controlling the routing of signal information between processing elements, the routing between processing elements in the same cluster being solely by way of the local electronic switching means associated with the respective cluster, and the routing between processing elements from a sending cluster to a receiving cluster being either directly by way of a light-emitting means associated with said sending cluster, the optical network and a light-detecting means associated with said receiving cluster or by way of the local electronic switching means in said sending cluster and/or in said receiving cluster and by way of a light-emitting means associated with said sending cluster, the optical network and a light-detecting means associated with said receiving cluster.

2. An interconnection network of claim 1 which includes a plurality of circuit boards, and each circuit board supports one cluster of processing elements, a local electronic switching means, and a communications processing means, and means for supplying signal information to one array of light-emitting means and receiving signal information from one group of light-detecting means.

3. An interconnection network for an information processing system comprising:

N processing elements to be interconnected grouped in N/k clusters of k processing elements each;

electronic switching means for interconnecting electrically processing elements in a common cluster;

a plurality of arrays of light-emitting means, a separate array for each cluster, each array including N separate light-emitting means;

a plurality of groups of light-detecting means, a separate group for each cluster, each group including k light-detecting means;

means for forming N optical channels, a different channel terminating at a different one of each of the N light-detecting means;

means for directing light emitted from each of the separate light-emitting means in a common array into a different one of the optical channels;

means for routing signal information between different processing elements in a common cluster solely by way of the electric switching means, and means for routing signal information between processing elements in different clusters either by way of an optical channel or by way both of the electronic switching means and an optical channel.

* * * * *